US012725138B1

(12) United States Patent
Gordon, III

(10) Patent No.: US 12,725,138 B1
(45) Date of Patent: Sep. 1, 2026

(54) DISTRIBUTED LEDGER-BASED SYSTEM FOR GENERATING AND AUTOMATICALLY EXECUTING LIQUIDATION EVENTS FOR NON-OWNERSHIP-BASED SECURITIES

(71) Applicant: Equity Shift, Inc., Raleigh, NC (US)

(72) Inventor: Thomas Marshall Gordon, III, Raleigh, NC (US)

(73) Assignee: Equity Shift, Inc., Raleigh, NC (US)

( * ) Notice: Subject to any disclaimer, the term of this patent is extended or adjusted under 35 U.S.C. 154(b) by 0 days.

(21) Appl. No.: 19/275,342

(22) Filed: Jul. 21, 2025

(51) Int. Cl.
*G06Q 40/06* (2012.01)
*G06Q 20/10* (2012.01)
*G06Q 10/105* (2023.01)

(52) U.S. Cl.
CPC ............ *G06Q 20/10* (2013.01); *G06Q 40/06* (2013.01); *G06Q 10/105* (2013.01)

(58) Field of Classification Search
CPC ..................................................... G06Q 40/00
USPC ........................................................... 705/38
See application file for complete search history.

(56) References Cited

U.S. PATENT DOCUMENTS 5,687,968 A * 11/1997 Tarantino ................ A63F 3/081 463/16
6,098,051 A * 8/2000 Lupien .................. G06Q 40/08 705/30
6,272,474 B1 * 8/2001 Garcia .................. G06T 11/206 705/36 R
6,278,982 B1 * 8/2001 Korhammer ........... G06Q 40/06 705/36 R
6,356,911 B1 * 3/2002 Shibuya ............. G01C 21/3446 707/999.005
6,721,715 B2 * 4/2004 Nemzow ................ G06Q 40/00 705/41
7,062,361 B1 * 6/2006 Lane ....................... F25D 29/00 700/291
7,130,789 B2 * 10/2006 Glodjo ................... G06Q 40/06 705/37
7,315,840 B1 * 1/2008 Keith ..................... G06Q 40/00 705/37
7,392,213 B2 * 6/2008 Merkoulovitch ...... G06Q 40/08 705/36 R
7,831,494 B2 * 11/2010 Sloan ..................... G06Q 40/08 705/37
8,073,763 B1 * 12/2011 Merrin ................... G06Q 40/04 705/37
8,126,794 B2 * 2/2012 Lange ....................... G07F 7/10 705/36 R (Continued)

*Primary Examiner* — Kirsten S Apple
(74) *Attorney, Agent, or Firm* — Neo IP

(57) ABSTRACT

A platform receives selection of details of a non-ownership-based security from an administrator profile, such as participation rules, distribution rules, and liquidation value rules. The system automatically integrates with an internal database or external database to record parameters of potential participants in the security on an immutable, distributed ledger. The platform automatically transmits update messages to each potential participant, providing information regarding updates to details regarding the security. At the time of liquidation, the platform utilizes a ledger oracle to automatically identify owners of the security, relative distribution to each owner, and subsequently executes payouts to the owners of the security.

20 Claims, 12 Drawing Sheets

(56) References Cited

U.S. PATENT DOCUMENTS 8,359,260 B2 * 1/2013 Merrin .................. G06Q 40/04 705/37
8,417,618 B2 * 4/2013 Milne .................. G06Q 40/04 705/37
8,755,943 B2 * 6/2014 Wenzel .................. F24F 11/58 165/238
2002/0147671 A1 * 10/2002 Sloan .................. G06Q 40/00 705/36 R
2002/0147675 A1 * 10/2002 Das .................. G06Q 30/08 705/37
2002/0194099 A1 * 12/2002 Weiss .................. G06Q 40/06 705/36 R
2003/0182224 A1 * 9/2003 Horrigan .................. G06Q 40/04 705/37
2003/0200142 A1 10/2003 Hicks et al.
2004/0024692 A1 * 2/2004 Turbeville .................. G06Q 40/08 705/38
2005/0080703 A1 * 4/2005 Chiesa .................. G06Q 40/00 705/36 R
2005/0124408 A1 * 6/2005 Vlazny .................. G06Q 50/34 463/28
2008/0015871 A1 * 1/2008 Eder .................. G06Q 40/00 705/348
2009/0106140 A1 * 4/2009 De La Motte .................. G06Q 20/10 705/37
2009/0271252 A1 10/2009 AmEnde
2009/0307149 A1 * 12/2009 Markov .................. G06Q 40/06 705/36 R
2010/0088210 A1 * 4/2010 Gardner .................. G06Q 40/03 705/35
2011/0119166 A1 * 5/2011 Steinberg .................. G06Q 30/04 705/34
2012/0239453 A1 * 9/2012 Osogami .................. G06Q 10/04 705/7.25
2012/0323753 A1 * 12/2012 Norman .................. G06Q 40/00 705/37
2013/0275334 A1 * 10/2013 Andersen .................. G06Q 40/06 705/36 R
2014/0129404 A1 * 5/2014 White .................. G06Q 40/06 705/37
2014/0201110 A1 * 7/2014 Sato .................. G01R 21/133 705/412
2015/0058261 A1 * 2/2015 Parikh .................. H04L 67/1097 705/412
2015/0190923 A1 7/2015 Seo et al.
2015/0310461 A1 * 10/2015 Lee .................. G06Q 10/04 705/412
2015/0363866 A1 * 12/2015 Depew .................. G06Q 30/0633 705/26.8
2016/0321751 A1 * 11/2016 Creighton, IV .................. G06Q 40/04
2018/0074523 A1 * 3/2018 Cantrell .................. B64D 1/22
2018/0247250 A1 8/2018 Shum
2020/0027096 A1 * 1/2020 Cooner .................. G06Q 40/04
2020/0118068 A1 * 4/2020 Turetsky .................. H04L 63/123
2020/0151708 A1 * 5/2020 Sui .................. H04L 9/0637
2020/0294128 A1 * 9/2020 Cella .................. H04L 9/3239
2020/0311699 A1 10/2020 Ranjit et al.
2022/0261925 A1 * 8/2022 Kurczodyna .................. G06Q 20/0655
2023/0091805 A1 * 3/2023 Wolfberg .................. G06Q 40/06 705/35
2024/0135459 A1 * 4/2024 Yip .................. G06Q 20/065
2024/0428212 A1 * 12/2024 Bouse .................. G06Q 20/389
2025/0103996 A1 3/2025 Williams

* cited by examiner

FIG. 5
9:41
Back
OW Entity
100% Goal Payout:
$68,421.15
25% Milestone
Current Value
$75,340.23
13% above expectation
If objectives are reached, your share of the plan is estimated to be worth $68,421.15.
As of June 23, 2026, the company is 13% above expectations for its objectives. If this trend continues, your share is estimated to be worth $75,340.23.
iMessage
APP
APP
APP
APP
APP
APP
APP

DISTRIBUTED LEDGER-BASED SYSTEM FOR GENERATING AND AUTOMATICALLY EXECUTING LIQUIDATION EVENTS FOR NON-OWNERSHIP-BASED SECURITIES

BACKGROUND OF THE INVENTION

1. Field of the Invention

The present invention relates to distributed ledger-based platforms, and more specifically to distributed ledger-based platforms operable to define securities without defined owners and to execute liquidation events concerning those securities.

2. Description of the Prior Art

It is generally known in the prior art to provide distributed ledger-based platforms and to provide platforms for handling trades of securities, such as equity shares.

Prior art patent documents include the following:

US Patent Pub. No. 2009/0271252 for Method for developing and implementing an employee incentive plan by inventor AmEnde, filed Apr. 17, 2009 and published Oct. 29, 2009, discloses a method and system for tracking, calculating and implementing a self-adjusting employee incentive plan. The present invention provides a method and system for establishing an incentive plan, aligning the incentive plan to the employer's management and human resources goals, determining key attributes and related ranges, defining success factors, assessing incentive program reward constraints, and recommending a suitable employee incentive plan based upon all of the generated factors and inputs.

US Patent Pub. No. 2003/0200142 for On-line employee incentive system by inventors Hicks et al., filed Apr. 23, 2002 and published Oct. 23, 2003, discloses a method and system for administering and redeeming accumulated employee loyalty points over a distributed computer network such as a company's Intranet or the Internet. In general, the method includes two web-based modules which deliver the program to the employer/employee and interconnectivity to external systems. An employer administrative module allows managers to easily award points as well as run reports to track incentive activity. The employee module allows employees to check and redeem their points online. Employees can earn points for defined behaviors including perfect attendance, meeting sales quotas, or meeting a project deadline. The employee module offers secured login and handles point redemptions for items including certificates, merchandise, and travel. In addition to these modules, interconnectivity to various Human Resources Information Systems (HRIS), payroll, and compensation systems is provided. A second aspect of the present invention is generally characterized in an online employee loyalty system implementing the above method.

US Patent Pub. No. 2018/0247250 for System and method for transmitting peer performance evaluation data by inventor Shum, filed Feb. 5, 2018 and published Aug. 30, 2018, discloses a system for peer performance evaluation including a mobile device for peer performance evaluation. By means of a voting page displayed on the mobile device, users evaluate co-workers' job performance in a number of categories. The mobile device, communicatively coupled to a cloud server, uploads the performance data to the server. At the server, the performance data may be downloaded to a user device as a performance profile for the particular user, which is displayed on a performance profile page. The performance profiles are portable, allowing an employee to use the profile as evidence of his/her qualifications. The employer may make use of employee performance data and voting history data as inputs to an employee incentive program. Incentives may be displayed on a rewards page on the mobile device. The employer may make further use of the performance data to identify workstyles conducive to the employer's mission and culture.

US Patent Pub. No. 2025/0103996 for Intelligent systems and methods for employee performance evaluation by inventor Williams, filed Sep. 25, 2023 and published Mar. 27, 2025, discloses systems and methods for evaluating employee performance using A/I systems and the blockchain to store inputted system data and produced employee data derived from a performance evaluator. More particularly, the A/I based system herein provides highly accurate employee performance assessment, mitigation, improvement and prediction of future performance.

US Patent Pub. No. 2020/0311699 for Reward systems and methods that employ blockchain and digital crypto tokens to reward users within an organization by inventors Ranjit et al., filed Mar. 25, 2019 and published Oct. 1, 2020, discloses a system that includes a distributed database system (DDS) and a cloud computing platform that includes a reward system. The DDS includes a network of blockchain nodes that collectively store a distributed ledger of a blockchain. The DDS can also store a pool of digital crypto tokens for an organization and control distribution of the digital crypto tokens to users associated with the organization via a smart contract module that validates transactions involving the digital crypto tokens using smart contracts for each transaction to directly control peer-to-peer transfer of transferrable digital crypto tokens between the users under certain conditions. The reward system includes a reward module that can issue granted digital crypto tokens to users as a reward when they perform certain tasks. Each granted digital crypto token quantifies time spent performing a certain task and serves as a currency within the organization.

US Patent Pub. No. 2015/0190923 for Blockchain-based tokenized erp incentive system by inventors Anugu et al., filed Feb. 18, 2025 and published Jun. 12, 2025, discloses the "Blockchain-Based Tokenized ERP Incentive System" integrating several novel features that leverage advanced technology to enhance the functionality and effectiveness of Enterprise Resource Planning (ERP) systems. The Blockchain-Based Tokenized ERP Incentive System transforms enterprise incentive management through automation, security, and transparency. By integrating blockchain with ERP systems, it creates a scalable, fair, and efficient solution for rewarding performance while promoting sustainability.

SUMMARY OF THE INVENTION

The present invention relates to distributed ledger-based platforms, and more specifically to distributed ledger-based platforms operable to define securities without defined owners and to execute liquidation events concerning those securities.

It is an object of this invention to provide for the ability to define securities without specified ownership until time of liquidation, and then to utilize distributed ledger-based methods to distribute funds to participants at the time of liquidation.

In one embodiment, the present invention is directed to a system for generating a non-ownership-based security and automatically executing a liquidation event for the non-ownership-based security, including a server platform, including a processor and a memory, operable to generate a plurality of user profiles associated with a plurality of user devices, wherein the server platform receives selection from one or more of the plurality of user devices of parameters for the non-ownership-based security, including a start date, an end date, one or more participation rules, and/or one or more distribution rules, and wherein the server platform generates the non-ownership-based security based on the parameters, wherein the parameters are recorded on an immutable, distributed ledger, wherein the server platform connects to at least one internal database or at least one external database and receives information regarding one or more participants in the non-ownership-based security from the at least one internal database or the at least one external database, wherein the server platform determines a liquidation trigger event, wherein the server platform utilizes a ledger oracle to determine the one or more participation rules for the non-ownership-based security and determines one or more designated beneficiaries of the non-ownership-based security based on the one or more participation rules, wherein the server platform utilizes the ledger oracle to determine the one or more distribution rules for the non-ownership-based security and determines an amount to distribute to the one or more designated beneficiaries based on the one or more distribution rules, and wherein the server platform automatically distributes funds and/or other benefits to one or more financial accounts associated with the one or more designated beneficiaries.

In another embodiment, the present invention is directed to a method for generating a non-ownership-based security and automatically executing a liquidation event for the non-ownership-based security, including a server platform, including a processor and a memory, generating a plurality of user profiles associated with a plurality of user devices, wherein the server platform receiving selection from one or more of the plurality of user devices of parameters for the non-ownership-based security, including a start date, an end date, one or more participation rules, and/or one or more distribution rules, and generating the non-ownership-based security based on the parameters, recording the parameters on an immutable, distributed ledger, the server platform connecting to at least one internal database or at least one external database and receiving information regarding one or more participants in the non-ownership-based security from the at least one internal database or the at least one external database, the server platform determining a liquidation trigger event, the server platform utilizing a ledger oracle to determine the one or more participation rules for the non-ownership-based security and determining one or more designated beneficiaries of the non-ownership-based security based on the one or more participation rules, the server platform utilizing the ledger oracle to determine the one or more distribution rules for the non-ownership-based security and determining an amount to distribute to the one or more designated beneficiaries based on the one or more distribution rules, and the server platform automatically distributing funds and/or other benefits to one or more financial accounts associated with the one or more designated beneficiaries.

In yet another embodiment, the present invention is directed to a system for generating a non-ownership-based security and automatically executing a liquidation event for the non-ownership-based security, including a server platform, including a processor and a memory, operable to generate a plurality of user profiles associated with a plurality of user devices, wherein the server platform receives selection from one or more of the plurality of user devices of parameters for the non-ownership-based security, including a start date, an end date, one or more participation rules, one or more liquidation value rules, and/or one or more distribution rules, and wherein the server platform generates the non-ownership-based security based on the parameters, wherein the parameters are recorded on an immutable, distributed ledger, wherein the server platform determines a liquidation trigger event, wherein the server platform utilizes a ledger oracle to determine the one or more liquidation value rules to determine a total value of the non-ownership-based security, wherein the server platform utilizes the ledger oracle to determine the one or more participation rules for the non-ownership-based security and determines one or more designated beneficiaries of the non-ownership-based security based on the one or more participation rules, wherein the server platform utilizes the ledger oracle to determine the one or more distribution rules for the non-ownership-based security and determines an amount to distribute to the one or more designated beneficiaries based on the one or more distribution rules, and wherein the server platform automatically distributes funds and/or other benefits to one or more financial accounts associated with the one or more designated beneficiaries.

These and other aspects of the present invention will become apparent to those skilled in the art after a reading of the following description of the preferred embodiment when considered with the drawings, as they support the claimed invention.

DETAILED DESCRIPTION

Figure 1:
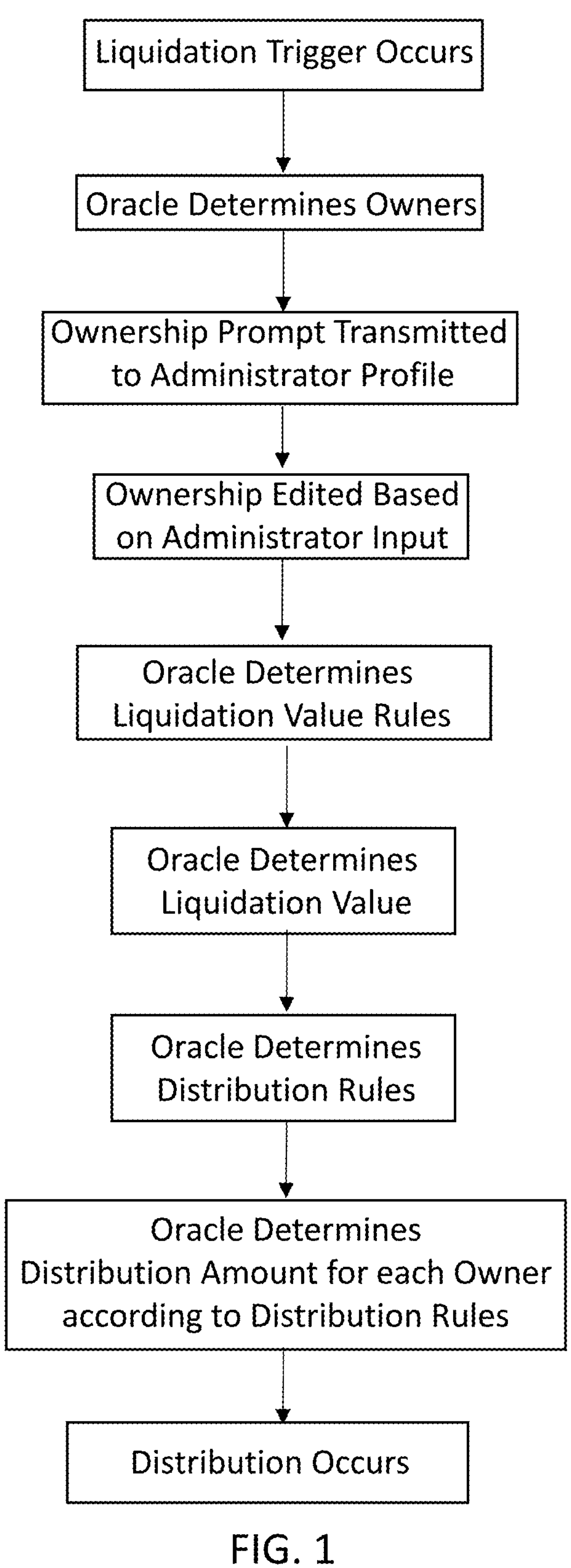
FIG. 1 illustrates a flow chart for a liquidation event carried out according to one embodiment of the present invention.

The present invention is generally directed to distributed ledger-based platforms, and more specifically to distributed ledger-based platforms operable to define securities without defined owners and to execute liquidation events concerning those securities.

In one embodiment, the present invention is directed to a system for generating a non-ownership-based security and automatically executing a liquidation event for the non-ownership-based security, including a server platform, including a processor and a memory, operable to generate a plurality of user profiles associated with a plurality of user devices, wherein the server platform receives selection from one or more of the plurality of user devices of parameters for the non-ownership-based security, including a start date, an end date, one or more participation rules, and/or one or more distribution rules, and wherein the server platform generates the non-ownership-based security based on the parameters, wherein the parameters are recorded on an immutable, distributed ledger, wherein the server platform connects to at least one internal database or at least one external database and receives information regarding one or more participants in the non-ownership-based security from the at least one internal database or the at least one external database, wherein the server platform determines a liquidation trigger event, wherein the server platform utilizes a ledger oracle to determine the one or more participation rules for the non-ownership-based security and determines one or more designated beneficiaries of the non-ownership-based security based on the one or more participation rules, wherein the server platform utilizes the ledger oracle to determine the one or more distribution rules for the non-ownership-based security and determines an amount to distribute to the one or more designated beneficiaries based on the one or more distribution rules, and wherein the server platform automatically distributes funds and/or other benefits to one or more financial accounts associated with the one or more designated beneficiaries.

In another embodiment, the present invention is directed to a method for generating a non-ownership-based security and automatically executing a liquidation event for the non-ownership-based security, including a server platform, including a processor and a memory, generating a plurality of user profiles associated with a plurality of user devices, wherein the server platform receiving selection from one or more of the plurality of user devices of parameters for the non-ownership-based security, including a start date, an end date, one or more participation rules, and/or one or more distribution rules, and generating the non-ownership-based security based on the parameters, recording the parameters on an immutable, distributed ledger, the server platform connecting to at least one internal database or at least one external database and receiving information regarding one or more participants in the non-ownership-based security from the at least one internal database or the at least one external database, the server platform determining a liquidation trigger event, the server platform utilizing a ledger oracle to determine the one or more participation rules for the non-ownership-based security and determining one or more designated beneficiaries of the non-ownership-based security based on the one or more participation rules, the server platform utilizing the ledger oracle to determine the one or more distribution rules for the non-ownership-based security and determining an amount to distribute to the one or more designated beneficiaries based on the one or more distribution rules, and the server platform automatically distributing funds and/or other benefits to one or more financial accounts associated with the one or more designated beneficiaries.

In yet another embodiment, the present invention is directed to a system for generating a non-ownership-based security and automatically executing a liquidation event for the non-ownership-based security, including a server platform, including a processor and a memory, operable to generate a plurality of user profiles associated with a plurality of user devices, wherein the server platform receives selection from one or more of the plurality of user devices of parameters for the non-ownership-based security, including a start date, an end date, one or more participation rules, one or more liquidation value rules, and/or one or more distribution rules, and wherein the server platform generates the non-ownership-based security based on the parameters, wherein the parameters are recorded on an immutable, distributed ledger, wherein the server platform determines a liquidation trigger event, wherein the server platform utilizes a ledger oracle to determine the one or more liquidation value rules to determine a total value of the non-ownership-based security, wherein the server platform utilizes the ledger oracle to determine the one or more participation rules for the non-ownership-based security and determines one or more designated beneficiaries of the non-ownership-based security based on the one or more participation rules, wherein the server platform utilizes the ledger oracle to determine the one or more distribution rules for the non-ownership-based security and determines an amount to distribute to the one or more designated beneficiaries based on the one or more distribution rules, and wherein the server platform automatically distributes funds and/or other benefits to one or more financial accounts associated with the one or more designated beneficiaries.

Distributed ledger (e.g., blockchain) based technology allows for creation and implementation of security types that have not been possible otherwise. This includes handling securities in a way not previously conceived, such as defining securities that do not have defined owners until the time of execution. Having securities without defined ownership allows for the ability to set criteria for inclusion in the security, with participants meeting these criteria changing over time and only be set at the time of liquidation. Furthermore, relative distribution of funds from liquidation to each participant is able to vary according to distribution criteria defined for the security until the time of liquidation. Furthermore, at the time of liquidation, the implementation of the distributed ledger of the present invention provides for the ability to automatically validate a list of owners and an amount to distribute to each owner based on information stored on the distributed ledger.

One example of an implementation of a security not previously possible is one designating inhabitants of multi-family housing, where, at the time of selling the housing, the inhabitants of the multi-family housing are provided appropriate distributions from the sale of the housing. For many, this system is able to replace prior art systems utilizing joint tenancy in a way only possible through application of distributed ledger-based technology. The implementation of a security where ownership is not defined until liquidation is important in this scenario as the inhabitants of the housing are likely to change over time and the system is likely to only be beneficial insofar as it does not impart an ownership right in the housing to all intermediary inhabitants of the housing who later leave before the date of the liquidation.

Another application of the system of the present invention is implementation of a broad-based ownership program (BBOP). As companies struggle to increase revenue, decrease costs, and increase efficiency to achieve financial objectives, a key consideration is employee motivation. For executives and other high level managerial positions, employee stock ownership plans (ESOPs) have been implemented in order to align incentives between employees and the company as a whole, providing additional motivation to help the company to succeed. However, such stock ownership plans are impractical or even impossible to implement at a scale that provides benefit to each employee, while still allowing for necessary or advantageous cash infusion into the business. This is especially an issue for businesses owned by private equity for several reasons. ESOPs often increase the complexity of acquisitions of a company and therefore the time needed to carry out the acquisition, which also increases the risk the deal will fall through. Additionally, the increased cost of ESOPs often prevents the company from investing those funds in otherwise worthwhile expenditures, such as those used to grow or maintain assets. ESOPs also cost the company even in instances where the company does not meet important financial objectives, or even shrinks. These issues are compounded when the participants in the plans include an entire, potentially very large workforce of a company.

Alternative broad-based ownership programs (BBOPs) have been proposed that do not require the complex large-scale share distribution of ESOPs, but which tie the financial objectives of the company with the incentives of the employees to provide broad-based motivation. However, existing implementations of these programs have met with issues of being too vague, not specifically setting the consequences of meeting particular financial goals, and therefore being unreliable for providing alluded-to benefits for employees. Because these systems do not enforce measurable goals and have unclear incentives, the intended motivating effect is often minimal and even potentially counterproductive if employees feel that they have not properly been rewarded for the company's success. One reason for the issues with previous attempts at these incentives programs is that no automated system exists which is able to track all the recipients of the incentives, provide updates for those incentives, and automatically work to distribute benefits, thereby rendering actual implementation of the programs prohibitively complex. The present invention addresses these issues by providing a platform for constructing benefits programs, providing updates regarding progress, and automatically executing the programs by integrating with HRIS programs to continuously track current employees that are eligible to receive the benefits.

Referring now to the drawings in general, the illustrations are for the purpose of describing one or more preferred embodiments of the invention and are not intended to limit the invention thereto.

In one embodiment, the present invention includes a server platform, including at least one processor and at least one memory, in communication with one or more databases. The server platform is able to generate a plurality of user profiles, based on input received from one or more user devices, where the user profiles include information including, but not limited to, login information, contact information (e.g., email address, phone number, etc.), personal information (e.g., name, address, etc.), one or more preferences and/or settings for the platform, one or more connections to other user profiles, one or more companies designated as associations, a role, one or more permissions for acting on the platform, a past activity history, one or more saved associated documents, and/or other information. Based on the roles assigned to each user profile, user profiles are able to act in different capacities, such as administrator profiles, investor profiles, employee profiles, and/or one or more other types of profiles. Administrator profiles, for example, are able to set up programs, see uploaded documents regarding a company, see financial information regarding a company, edit participation in created programs, add or remove associations with employees, and/or other company-visibility or management related roles. Administrator profiles are able to set up to have different combinations of permissions, including different visibilities or the abilities to perform different types of actions. Administrator profiles typically have greater visibility into information regarding an associated company and other employees than a typical employee profile, which is often only able to see information designated as visible by an administrator profile and information regarding their own profiles or connections, and to perform more limited actions, typically those that concern only their own profiles.

The system of the present invention includes three important steps or processes. First, based on user input from at least one administrator profile, the platform generates the security and criteria associated with participation and distribution for the security. Second, the platform automatically updates information for each potential owner of the security (i.e., each "participant") based on application programming interface (API) calls to at least one external database. This information is then recorded on an immutable, distributed ledger for reference at a time of liquidation. Finally, upon a trigger event for the security, defined on a security-by-security basis, the platform performs a liquidation event by identifying owners at the time of liquidation and then executing distribution to each owner.

The first step performed by the system is defining the security. In one embodiment, a security is defined based on user input by at least one administrator profile, wherein the input is able to include a name of the security, one or more criteria for inclusion in the security, one or more criteria for exclusion from the security, one or more distribution rules for the security, one or more security value criteria, one or more liquidation criteria, a start date for the security, a maximum value for the security, a minimum value for the security, a maximum number of participants, a minimum number of participants, and/or one or more other details of the security. In one embodiment, details regarding the security, especially for inclusion criteria, exclusion criteria, distribution rules, security value criteria, and liquidation criteria are recorded on at least one immutable, distributed ledger.

The one or more criteria for inclusion in the security determine who, at the time of liquidation, will receive any payout or benefits as a result of the security. Inclusion criteria are able to vary greatly between different individual securities. However, examples of inclusion criteria include, but are not limited to, employment at one or more companies, occupancy of one or more buildings, maximum salary, minimum salary, employment position, minimum number of hours worked, minimum performance ratings, presence in one or more designated locations (e.g., countries, cities, regions, etc.), absence from one or more designated locations (e.g., countries, cities, regions, etc.), past participation in one or more programs, signature on one or more related documents, one or more certifications, an education level, and/or other criteria. Any number of inclusion criteria are able to be set for a single security, such that a maximum salary and an employment position are able to be set as criteria for inclusion. For example, gas station clerks making below a preset amount may be defined as the only eligible individuals for a particular security. In one embodiment, the platform sets multiple associated sets of criteria. This is useful where inclusion criteria set as a general rule are too inclusive or exclusive when applied to all individuals, but are appropriate when paired with one or more inclusion criteria. For example, a single security is able to designated with a first associated set of criteria as teachers making less than $60,000 and a second associated set of criteria of janitorial staff working greater than 30 hours a week. In this example, setting the general criteria of working greater than 30 hours a week is not intended to be applied to teachers and therefore is only an appropriate criteria when paired with the position requirement. Furthermore, the maximum salary criteria is only appropriate when applied to teachers and is not intended to limit inclusion of janitorial staff. In one embodiment, inclusion criteria are able to include explicit designation of one or more individuals or groups of individuals (e.g. members of the Smith family).

The one or more criteria for exclusion in the security determine who, at the time of liquidation, will not receive any payout or benefits as a result of the security. Exclusion criteria are similarly able to vary greatly between different individual securities. In one embodiment, exclusion criteria and inclusion criteria are assigned ranks such that the exclusion criteria or the inclusion criteria are applied first. For example, the inclusion criteria are able to be applied first to designate who will be initially included and then the exclusion criteria later determines which of those otherwise included will be excluded. Alternatively, exclusion criteria are able to first set who will not be included as participants and inclusion criteria are then able to overwrite this exclusion criteria for one or more participants. Examples of exclusion criteria include, but are not limited to, maximum salary, minimum salary, employment position, maximum number of hours worked, maximum performance ratings, presence in one or more designated locations (e.g., countries, cities, regions, etc.), absence from one or more designated locations (e.g., countries, cities, regions, etc.), past participation in one or more programs, lack of one or more certifications, an education level, and/or other criteria. Similarly to inclusion criteria, the platform is able to set multiple associated sets of exclusion criteria. For example, managers making more than $100,000 and retail workers working less than 40 hours a week are able to be excluded. In one embodiment, exclusion criteria are able to include explicit designation of one or more individuals or groups of individuals (e.g. members of the Smith family).

The one or more distribution rules are able to include the relative amount of funds or other benefits to be distributed to each participant as a result of the liquidation event. Distribution rules essentially set the relative amount of ownership in the security at the moment of liquidation. In one embodiment, an even distribution rule or no distribution rule is able to be set, such that all participants identified as owners at liquidation receive the same amount of funds or benefits. Alternatively, by way of example and not limitation, distribution is able to depend proportionally (linearly or otherwise) with salary, tenure, number of hours worked, value of contributions or deliverables (e.g., value of products manufactured), number of contributions or deliverables (e.g., number of products manufactured), quality scores for contributions or deliverables, number of individuals being managed, value of property within a building, floor where the participant lives, number of properties owned by an individual, number of client meetings, and/or any other measurable, relevant criteria. In one embodiment, the one or more distribution rules set the relevant amount received by each individual or the relative percentage received by each individual. Utilizing amount or percentage is important, as it is able to determine if the one or more distribution rules affect the total amount of the security liquidation. For example, if the distribution rules merely determine the percentage of distribution, then the amount is set without regard to distribution. However, if the distribution rules determine the amount of distribution then the total value of the security being liquidated is able to be determined by how each participant corresponds to the distribution rules. Alternatively, rules determining amount of distribution is able to be compatible with a separate system for determining security value by providing an order or rank to each participant, such that specific individuals are paid out their relative distribution amounts first before others of lower order and rank and distributions cease once the total value of the security, determined outside the distribution rules, is reached. One of ordinary skill in the art will understand that any combination of these distribution rules is able to be determined in defining the security.

Security value criteria are rules that determine a total value of the security being liquidated. Security liquidations are able to evaluated as preset values determined by one or more triggers or as proportional to one or more quantities (e.g., business financial metrics, home values, stock market values, etc.). In a first example, the security value criteria for a preset value distribution determines whether liquidation occurs at all or whether the liquidation includes any value based on whether one or more quantities exceeds a specific threshold value, is equal to a specific threshold value, or is less than a specific threshold value (e.g., one or more financial metrics, home values, stock market values, etc.). By way of example and not limitation, if the value of an apartment building is greater than $2,000,000, then the liquidation occurs at a value of $1.5 million, but if that value is not reached, then no liquidation occurs. In a second example, the security value criteria for proportional distribution determines the value of a security based on one or more designated quantities and according to one or more value equations. By way of example and not limitation, the value of the security is equal to 75% of a property value at a specific date, such that a value of $1,000,000 imparts a security value of $750,000. In order to prevent security value criteria that directly conflict with distribution rules, in one embodiment, if contradictory security value criteria and distribution rules are generated (e.g., if both influence the total value of the security in different ways), then the platform automatically generates a clarity warning and transmits the warning to the administrator profile. A mixture of set value and proportional distribution is also able to be used, such that the security has no value above or below a preset threshold, but beyond the threshold a proportional value system is used.

In one embodiment, in order to constrain the total value of the security, maximum and/or minimum values of the security are able to be set. This allows proportional security value criteria to be used while fixing the upper or lower bounds for the value to allow for fair distribution. Maximum and/or minimum values are able to constrain both security value criteria and distribution rules, when the distribution rules are proportional and determine total amount of distribution.

In one embodiment, a minimum and/or maximum amount of participants is able to be set. Setting maximum and minimum numbers of participants helps to ensure that liquidation funds or benefits are not too concentrated, nor too spread thin, in instances where that is a potential concern. In one embodiment, where a maximum or minimum number of participants is set, identification of owners at the time of liquidation is limited to those with the highest or otherwise best values corresponding to one or more distribution rules, is conducted by selecting randomly from the pool of potential owners, or is performed according one or more provided formulas. Therefore, setting maximum or minimum number of participants is either not compatible with or not suited for use in securities with explicit cutoff values defining participation for identification of ownership at time of liquidation.

These parameters, among others, are there able to determine (1) who will be assigned as an owner at the time of liquidation and therefore receive some funds or benefits as a result, (2) how much will be allocated to each owner at the time of liquidation, and (3) when or under what conditions liquidation will occur. Each of these conditions, definitions, or parameters are able to be saved to an immutable, distributed ledger, to allow for automated identification of ownership and distribution of funds or benefits at the time of liquidation.

In one embodiment, the definition of the security also includes designation of one or more internal databases or external databases from which data is to be used to determine ownership, distribution, or conditions for liquidation. In addition to or in lieu of the use of internal or external databases, other sources of information able to be designated include input or messages manually entered by one or more specified profiles (e.g., an administrator profile) and/or other information sources.

After definition of the security, the second critical step executed by the platform is regularly and periodically updating parameters relating to the conditions for liquidation or identification of ownership. Updates are able to include API calls to one or more internal or external databases that are designated in the definition of the security as providing relevant data for determining ownership, distribution, or conditions for liquidation. Additionally, or alternatively, updates for one or more relevant quantities are able to include input or messages from one or more user profiles associated with the security (e.g., an administrator profile).

In one embodiment, internal or external databases include knowledge bases having lists of individuals that are members, employees, residents, attendees, adherents, shareholders, or other positions relative to an organization, location, or other system associated with the security. For example, where the security defines rights in liquidation of a building, an internal or external database including a list of residents or tenants of the building with information for each resident or tenant is able to be used. In another case, where the security defines rights to shares for employees of an organization, an internal or external database defining a list of employees of the organization and information regarding each employee (e.g., a human resource information system (HRIS)) is able to be used.

Receiving messages or input directly from an administrator allows for the use of parameters or quantities to define participation, distribution, or conditions or liquidation that are not easily accessible by any specific, publicly available database. For instance, if conditions for liquidation are driven by one or more financial metrics of a company (e.g., price per share, gross profit, etc.) and those financial metrics are not available on any database, then the system is able to receive input of these quantities from the administrator profile.

Whether received automatically via calling one or more databases or received via input from one or more profiles, the platform is operable to automatically record information received through updates on an immutable, distributed ledger.

FIG. 1 illustrates a flow chart for a liquidation event carried out according to one embodiment of the present invention.

After updating relevant quantities, the third critical step performed by the platform is executing a liquidation event, including identifying owners at the time of liquidation and distributing funds or benefits to those owners. Liquidation is able to begin under one of three basic conditions (i.e., three different types of triggers). First, liquidation is able to occur at the designation of one or more administrator profiles, based on input from a user device associated with the profile. This liquidation is able to be arbitrary, at the subjective decision of the administrator profile, or based on the administrator profile's conclusion that one or more specific conditions have been met. The second liquidation condition is if a date or time has been reached as designated in the definition of the security as the time of liquidation. The platform is able to automatically receive data and time information and therefore is able to automatically begin liquidation and distribution upon reaching this relevant time point. Finally, a third liquidation condition is able to occur when the platform automatically determines if one or more quantities meet one or more designated threshold values for liquidation based on information received from the regular and periodic updates. In one embodiment, where the liquidation event occurs automatically, the platform is operable to utilize an oracle on an immutable, distributed ledger to determine if one or more values cause the security to meet the one or more designated threshold values for liquidation.

In one embodiment, the platform includes at least one ledger oracle configured to analyze the immutable, distributed ledger to determine both what criteria and rules to use for identification of ownership and distribution and, separately, to determine actual distribution amounts for each owner based on how parameters for each oracle correspond to the identified criteria and rules. For example, at the time of liquidation for a building with tenants identified as owners, the immutable, distributed ledger is able to use the at least one ledger oracle to determine that period of residency is a distribution criteria for each owner and the at least one ledger oracle is then able to also check what the residency period is for each owner to determine how much to distribute to each owner.

In one embodiment, after the platform determines the rules for ownership of the security based on the immutable, distributed ledger, accessed via the oracle, and determines which individuals meet the rules and those are considered owners based on parameters for the individuals on the immutable, distributed ledger, accessed via the oracle, the platform automatically transmits an ownership validation message including a prompt to one or more profiles (e.g., an administrator profile). The platform is able to receive input from the one or more profiles indicating one or more additional individuals to include as owners or to exclude to partially override the decisions of the platform.

In one embodiment, the liquidation value rules are determined based on reference to the recorded definition of the security on the immutable, distributed ledger, accessed via the oracle. In one embodiment, according to the liquidation value rules, the platform then determines the liquidation value based on one or more relevant parameters as determined according to the liquidation value rules. For example, if the liquidation value rules provide that the total liquidation value is determined based on property value for a building, then the platform determines obtains information regarding the property value of the building and uses that to determine the total liquidation value.

In one embodiment, after the owners of the security are defined, the platform then utilizes the oracle to determine, based on the immutable, distributed ledger, rules for relative distribution of funds or benefits to each owner. After determining the distribution rules, the platform determines an amount to distribute to each owner based on relevant parameters recorded on the immutable, distributed ledger, accessed via the oracle. Finally, after determining an amount to distribute to each owner, in one embodiment, the platform automatically distributes funds or benefits to one or more financial accounts or other accounts associated with each owner.

FIGS. 2-11, described below, provide an example implementation of the system of the present invention applied specifically to broad-based ownership program (BBOPs). One of ordinary skill in the art will understand however that these images are merely illustrious and analogous GUIs are also able to be provided for other implementations of securities without defined ownership.

Figure 2:
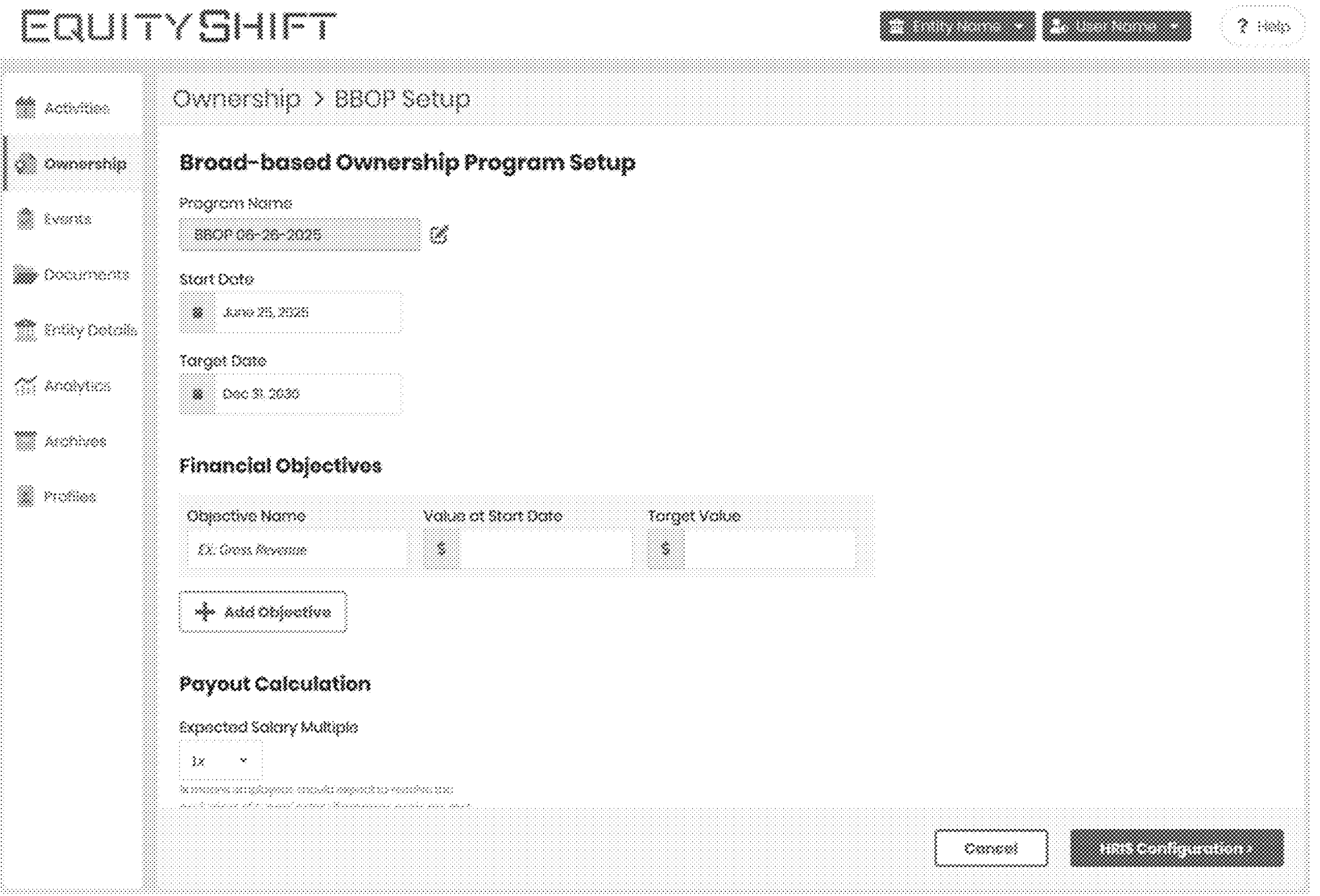
FIG. 2 illustrates a program setup graphical user interface (GUI) according to one embodiment of the present invention.

FIG. 2 illustrates a program setup graphical user interface (GUI) according to one embodiment of the present invention. The platform is able to receive selection to generate a new broad-based ownership program (BBOP) via a GUI of the platform from a user profile, typically an administrator profile. The program setup module receives information regarding the new BBOP, including a program name, a start date for the program, an end date for the program, one or more financial objectives, (e.g., gross revenue, gross profit, earnings Before interest, taxes, depreciation, and amortization (EBITDA), etc.), a method and parameters for payout calculation (e.g., expected salary multiplier, a minimum payout, a maximum payout, and/or one or more other parameters. Furthermore, the program setup module is able to receive a number of financial objectives that must be met (e.g., two out of four financial objectives must be met). The end date of the program is important as it is able to determine when the benefits of the program are distributed. In one embodiment, the difference between the start date and the end date is used to track a percentage progress towards the goal versus an amount of time left in the program.

In one embodiment, for each financial objective, the program setup module is able to receive a value of the parameter before beginning the program and a goal value (or a goal multiplier or percentage increase). As with the start date and the end date, including the goal value and the initial value, the platform is able to determine progress towards the goal at any given time based on receiving an updated value of the financial parameter. For example, if the initial gross revenue is 100 and the goal is 250, when the platform receives a present value of 150, the platform is able to determine that the program is 33.3% of the way to achieving the goal.

Payouts of the program most commonly include monetary rewards, but the system of the present invention also contemplates non-monetary rewards. Non-monetary rewards include additional vacation days, payment in alternative currency forms (e.g., cryptocurrency payments), one or more employment benefits (e.g., premier parking, a company vehicle, etc.), one or more amenities added to a workplace (e.g., new vending machines, remodeled staff lounge, etc.), and/or other forms of benefits. In one embodiment, the program setup module receives a payout paradigm. Payout paradigms indicate conditions for when the benefit is provided or the degree of the benefit provided. For example, a first paradigm includes an "all-or-nothing" paradigm wherein no benefits are provided if the requisite goals are not met. Alternatively, a second paradigm includes a "percentage progress" paradigm where benefits are proportional to the progress to the financial objectives by the end date.

Figure 3:
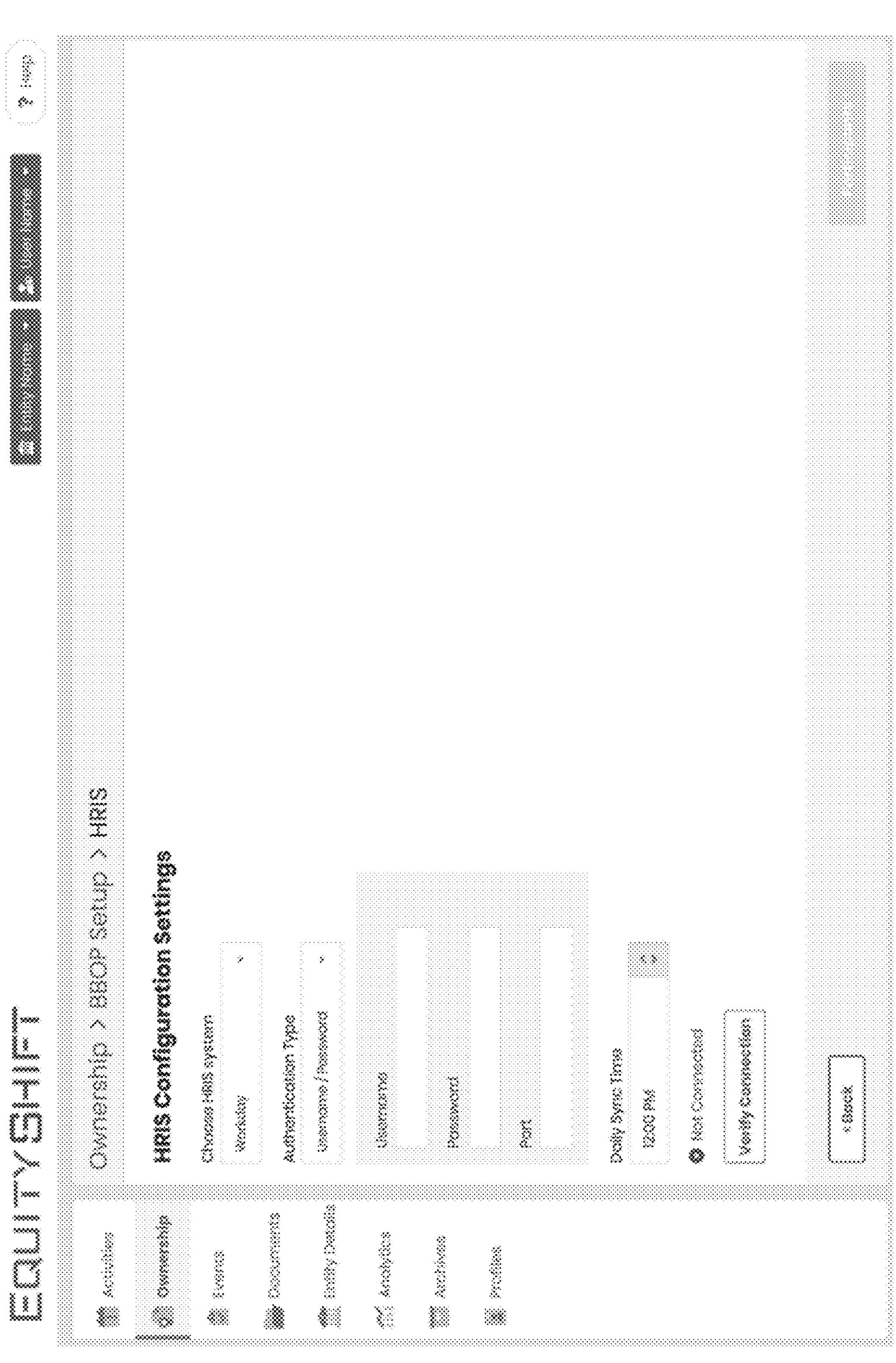
FIG. 3 illustrates an external information system configuration graphical user interface (GUI), specifically for a human resource information system (HRIS), according to one embodiment of the present invention.

FIG. 3 illustrates a human resource information system (HRIS) configuration graphical user interface (GUI) according to one embodiment of the present invention. In one embodiment, in order to determine how many participants take part in the BBOP and the identities of each participant, the platform is able to integrate with and regularly synchronize with an internal or third-party human resource information system (HRIS). In one embodiment, an HRIS configuration module receives a type or brand of HRIS, an authentication type (e.g., username/password, email/password, security questions, etc.), authentication information, synchronization frequency, synchronization time, one or more excluded individuals, one or more additional included individuals, and/or other information.

In one embodiment, the platform automatically initiates an application programming interface (API) call to the designated HRIS system and provides the designated authentication information in order to access a list of employees and associated information (e.g., title, salary, contact information, etc.) from the HRIS system. In order to stay up to date on the number of employees participating in the program, the amount of benefits to provide to each employee (if benefits are based on salary or number of participants), and where to contact each employee, daily synchronization or other frequencies of synchronization provides up-to-date information. This information allows the system to automatically provide updates and to automatically distribute benefits at the end date. Without regular synchronization, a system would potentially message individuals no longer with the company, fail to provide updates to new employees, or potentially pay unintended individuals at the end date. In instances where specific roles, classes, and salary levels of employees are excluded from the program (e.g., executives above a specific management level), receiving information regularly allows the benefits program to add or drop employees dynamically. In one embodiment, when an employee is added or dropped from the program based on role, class, or salary level, a notification is automatically sent to one or more contact addresses of the employee notifying the employee of a change of status with respect to the program. In one embodiment, the platform is able to receive edit selections from one or more administrator profiles to add additional excluded employees, remove excluded employees, change an end date, change target financial objectives, and/or change the HRIS system or account details used for synchronization.

In one embodiment, if the platform is unable to synchronize with the associated HRIS system, a notification is automatically provided to the administrator profile and/or one or more contact addresses associated with the administrator profile.

Figure 4:
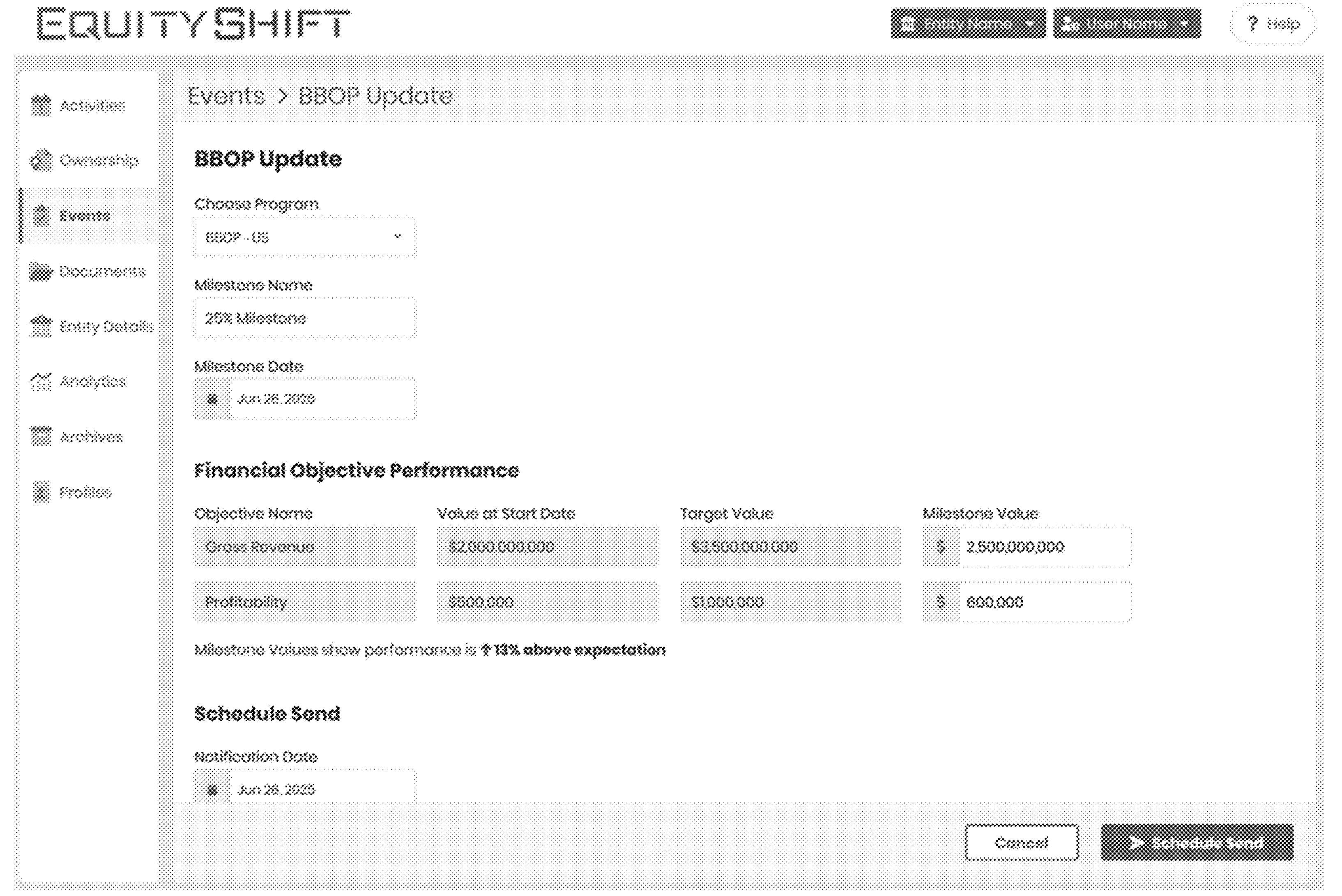
FIG. 4 illustrates an updates settings graphical user interface (GUI) according to one embodiment of the present invention.

FIG. 4 illustrates an updates settings graphical user interface (GUI) according to one embodiment of the present invention. The updates settings module is able to receive parameters for providing updates to one or more participants or administrators of a program by a user profile, especially an administrator profile. The updates settings module is able to receive parameters for updates in general (e.g., frequency of updates, standard language used for updates, information included in updates, etc.) and parameters for particular update messages (e.g., message text, date and time of update, values for the financial objective parameters as of the date and time of update, milestone name, etc.). In one embodiment, the updates settings module automatically displays the financial objectives set by the program setup module with associated input elements (e.g., text boxes) for each financial objective. According to the parameters received by the updates settings module, the platform automatically generates a message and sends the message to one or more contact addresses associated with each participating employee. In one embodiment, the one or more contact addresses are identified through integration with the HRIS system.

Figure 5:
FIG. 5 illustrates a program update message with progress to an individual goal of a participant according to one embodiment of the present invention.
Figure 6:
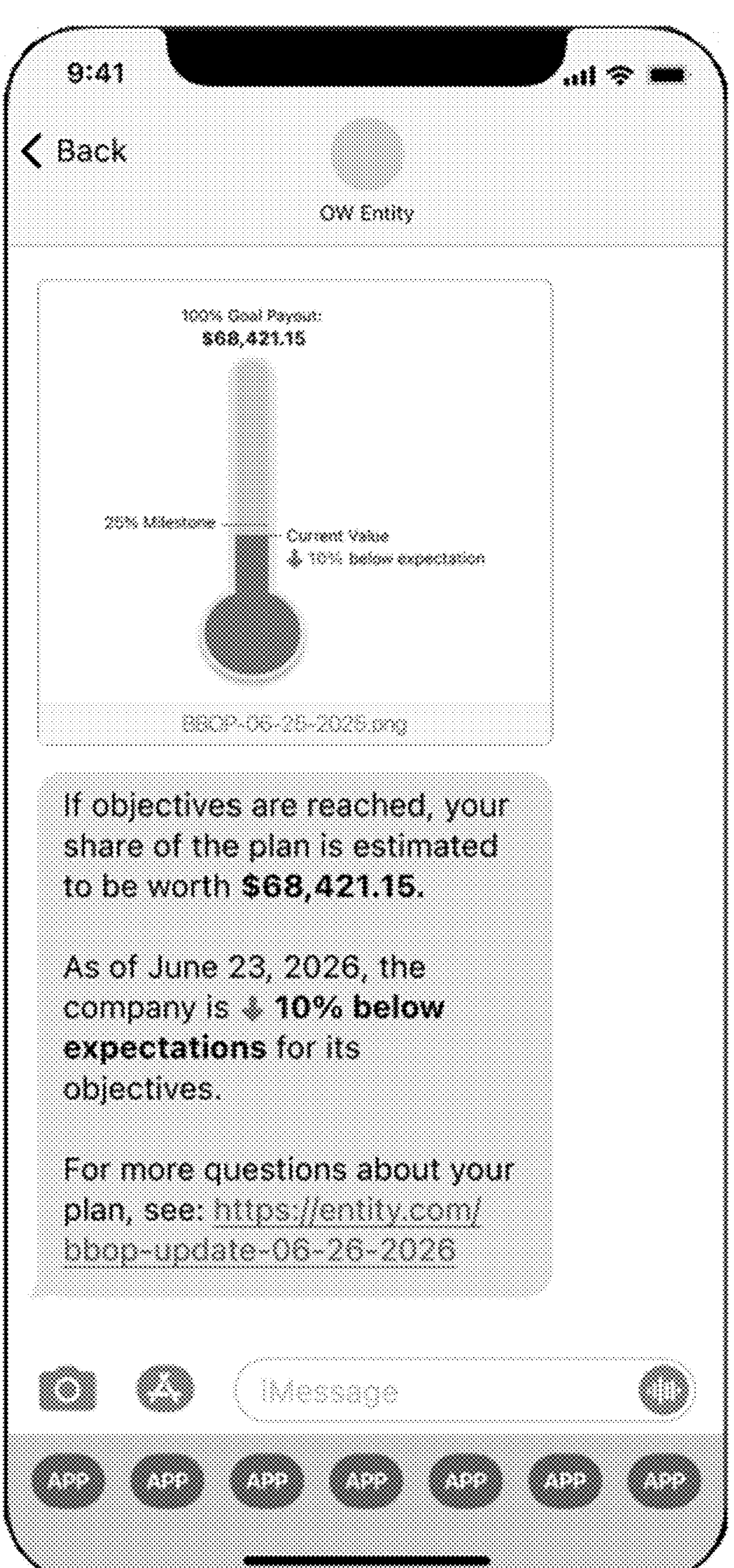
FIG. 6 illustrates a program update message with progress to an individual goal of a participant according to one embodiment of the present invention.

FIGS. 5 and 6 illustrate program update messages according to one embodiment of the present invention. In one embodiment, update messages are provided via text message (e.g., Short Message Service (SMS), Multimedia Messaging Service (MMS), etc.), but one of ordinary skill in the art will understand that other contact methods are also contemplated herein, including but not limited to email, automated voicemail messages, robocalls, messaging via one or more third party applications, and/or other means. In one embodiment, update messages include one or more graphs or other representations of progress towards a goal. By way of example and not limitation, the graphs provided in the update messages shown in FIGS. 5 and 6 are thermometers, showing a percentage filled based on how close to the financial objectives the company is. In one embodiment, as shown in FIGS. 5 and 6, the graph provides information regarding the status of the plan in relation to the potential reward from the BBOP for the particular user. For example, if the financial metric is 25% of the way to the target financial objective, then the thermometer shows the estimated total benefit for the particular user by the end date (e.g., at the current pace, the estimated benefit for the participant is $25,000). In one embodiment, the graph provides a comparison of the current progress toward one or more financial objectives compared to the expected progress (e.g., compared to progress if the financial objective linearly increased from the start date to the end date). In one embodiment, the graph provides information regarding the status of the plan in relation to the overall company goal in addition to or in lieu of the status related to the personal goal of the participant. In one embodiment, if the BBOP includes multiple financial objectives, graphs or other visualizations are provided for each financial objective. In one embodiment, the platform is operable to receive input, via the updates settings module of one or more graph or visualization types to use for the update messages.

In one embodiment, updates are transmitted regularly according to a fixed schedule set for the BBOP. In another embodiment, updates are sent in response to a request by an administrator profile for the BBOP.

Figure 7:
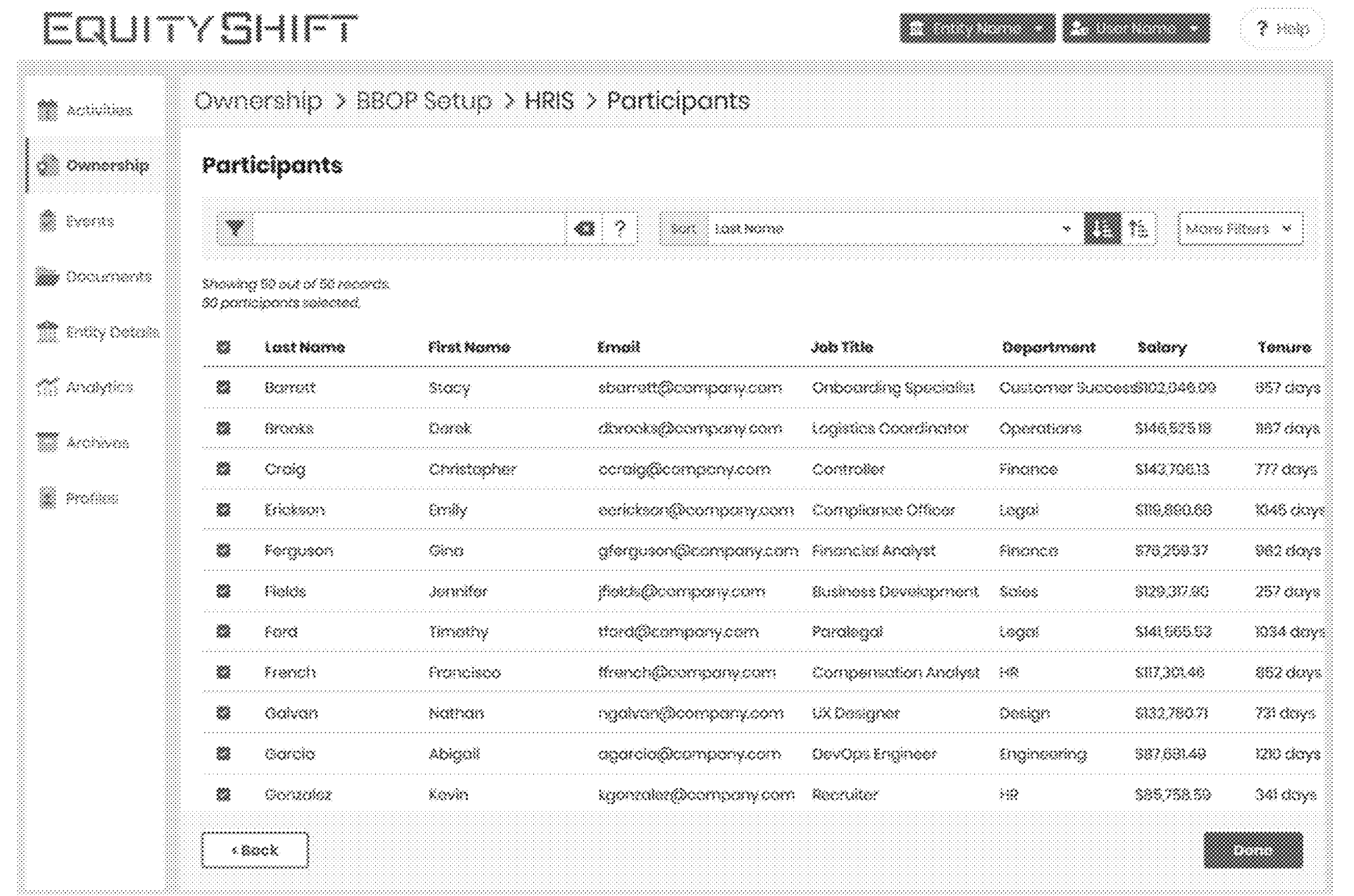
FIG. 7 illustrates a participant list graphical user interface (GUI) according to one embodiment of the present invention.

FIG. 7 illustrates a participant list graphical user interface (GUI) according to one embodiment of the present invention. In one embodiment, the platform includes a participant list module, allowing a user profile, especially an administrator profile, to view a list of all participants in the BBOP along with information associated with each participant, including but not limited to the name, contact information (e.g., email address), job title, department, salary, tenure, expected payout from the plan, and/or other information. In one embodiment, the participant list module is operable to receive manual selection from an administrator profile to add or remove one or more participants from the plan, or to change information regarding one or more participants (e.g., contact information, job title, etc.). In one embodiment, changing contact information automatically changes the destination of future update messages.

In one embodiment, the participant list module is operable to receive selection of one or filters, allowing the list to selectively show participants based on one or more data fields associated with each participant. In one embodiment, the participant list module is operable to receive selection of one or more sorting criteria, allowing the list to dynamically sort based on one or more data fields.

Figure 8:
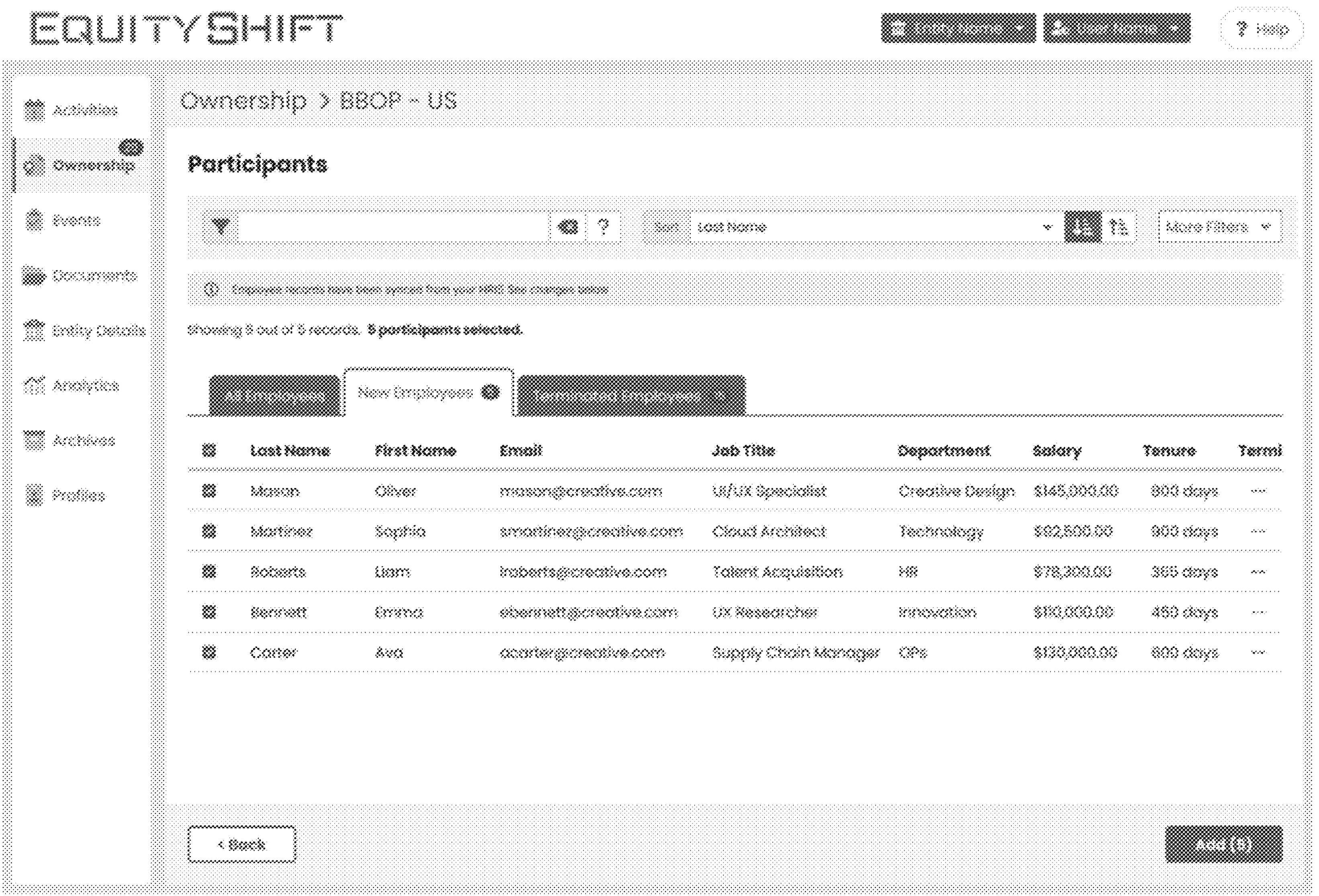
FIG. 8 illustrates a participant addition or subtraction graphical user interface (GUI) according to one embodiment of the present invention.

FIG. 8 illustrates a participant addition or subtraction graphical user interface (GUI) according to one embodiment of the present invention. In one embodiment, the platform includes an interface for an administrator profile to validate or reject additions or removals of participants from the security. Because ownership is not established until liquidation, this is not equivalent to adding or subtracting owners, but rather indicating whether particular individuals validly correspond to the participation criteria for the program based on data retrieved from the internal or external database. This validation step allows the administrator profile to provide custom exclusions or inclusions in an active manner. However, one of ordinary skill in the art will understand that, in another embodiment, participants are automatically added or dropped solely according to the participation criteria and changing the list of participants does not require input from an administrator profile. In one embodiment, the list includes different tabs for newly added participants (e.g., new employees) and recently dropped participants (e.g., terminated employees). In one embodiment, one or more of the list of newly added participants or dropped participants is able to be selected and the individuals added or dropped from the list of participants based on click selection or other user input from the administrator profile.

Figure 9:
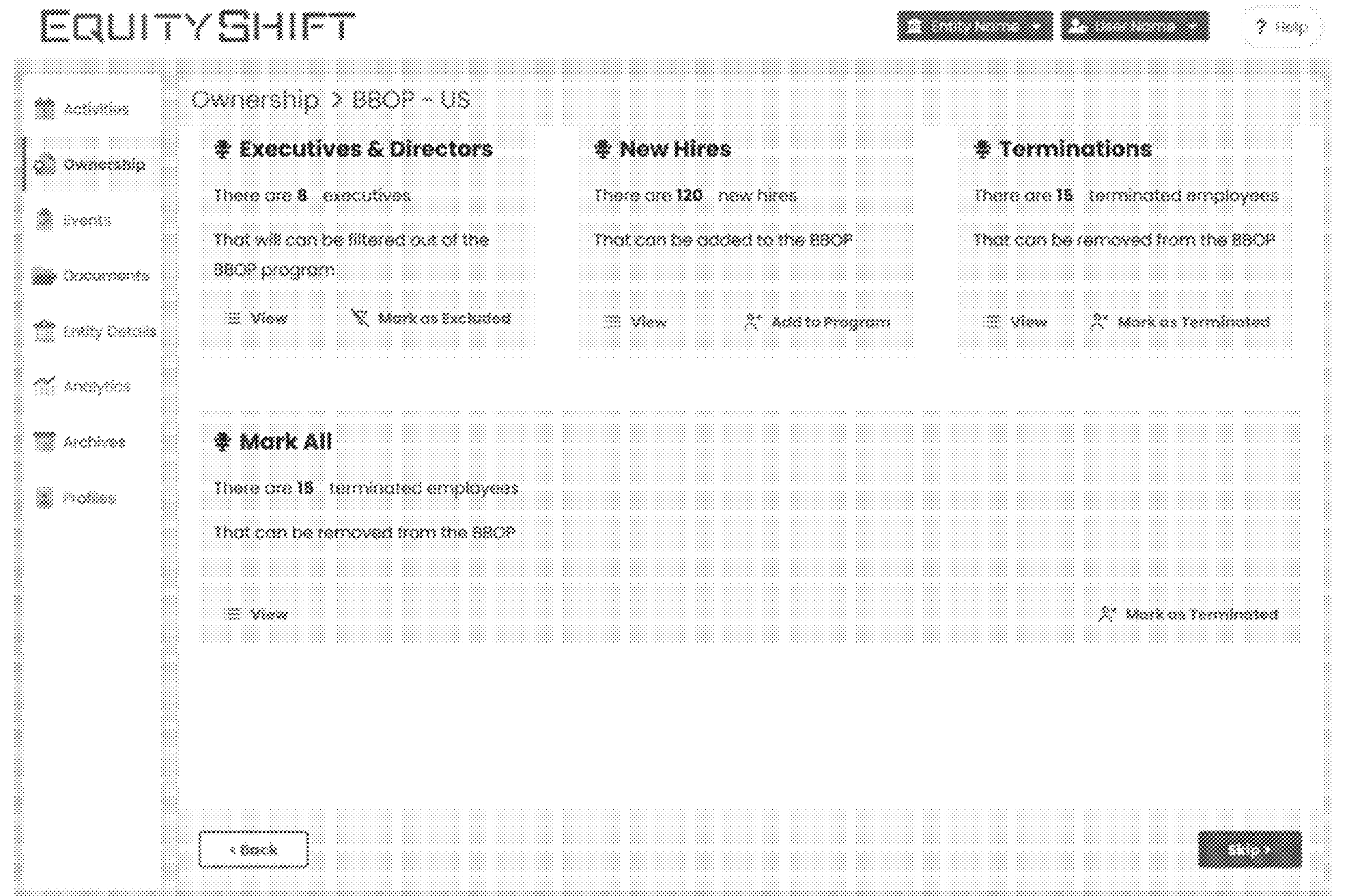
FIG. 9 illustrates a security ownership graphical user interface (GUI) according to one embodiment of the present invention.

FIG. 9 illustrates a security ownership graphical user interface (GUI) according to one embodiment of the present invention. In one embodiment, the platform generates a summary of ownership page for the security, showing a number of executives and directors that may be added or removed from the participant list, a list of new hires (e.g., since the participant list was last checked, since the security was created, etc.), a list of removed participants/terminations (e.g., since the participant list was last checked, since the security was created, etc.). In one embodiment, the summary of ownership page is able to receive click selection of one or more categories to allow the administrator profile to take further action.

Figure 10:
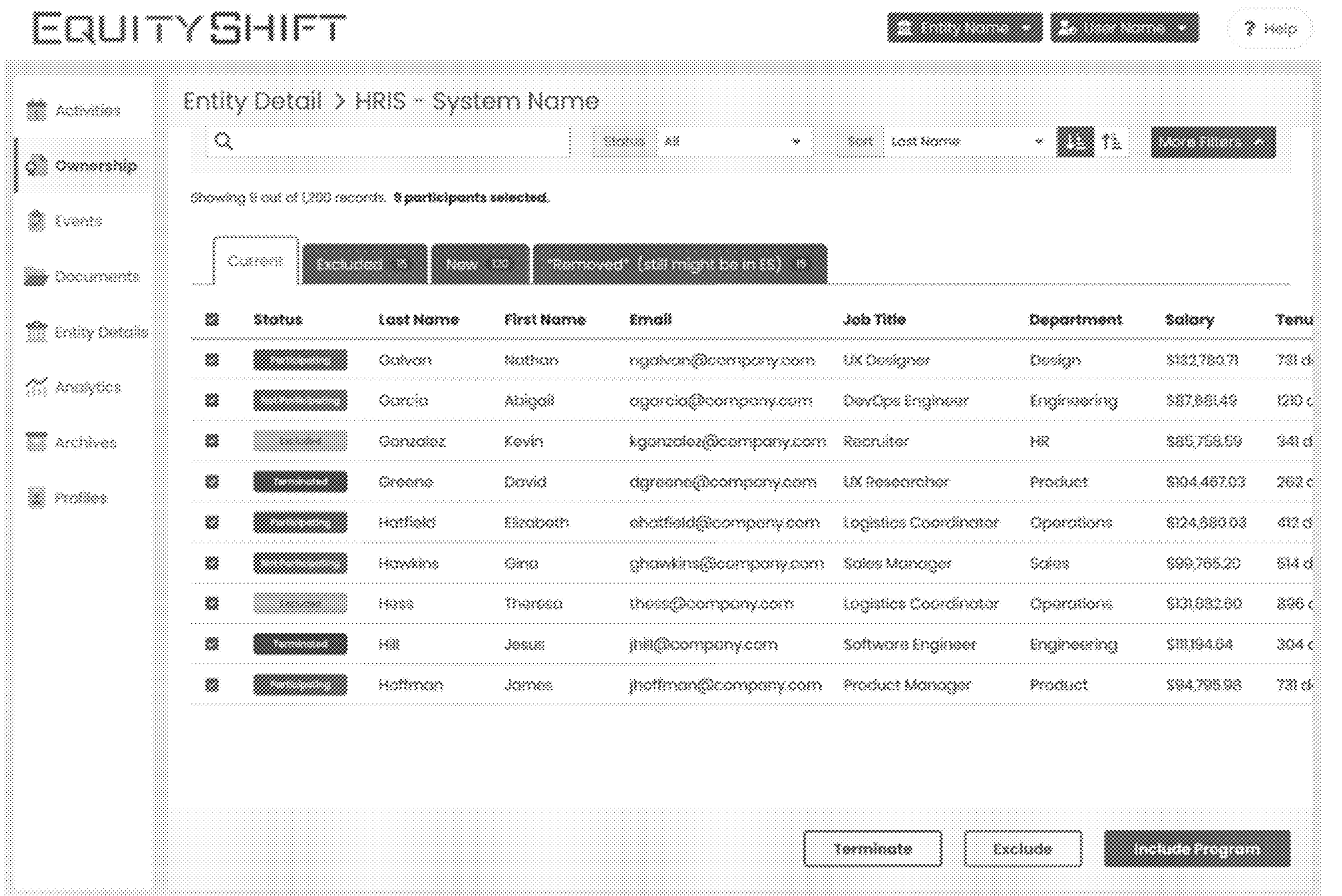
FIG. 10 illustrates a participant list with classification graphical user interface (GUI) according to one embodiment of the present invention.

FIG. 10 illustrates a participant list with classification graphical user interface (GUI) according to one embodiment of the present invention. In one embodiment, the list of participants includes status identifiers with regard to the security for ease of viewing. In one embodiment, the status identifiers include participating, not participating, excluded, terminated, new, and/or other status identifiers. In one embodiment, the platform integrates the security management system with a system for hiring or firing, or other third-party systems for adding or subtracting individuals to meet participation criteria.

Figure 11:
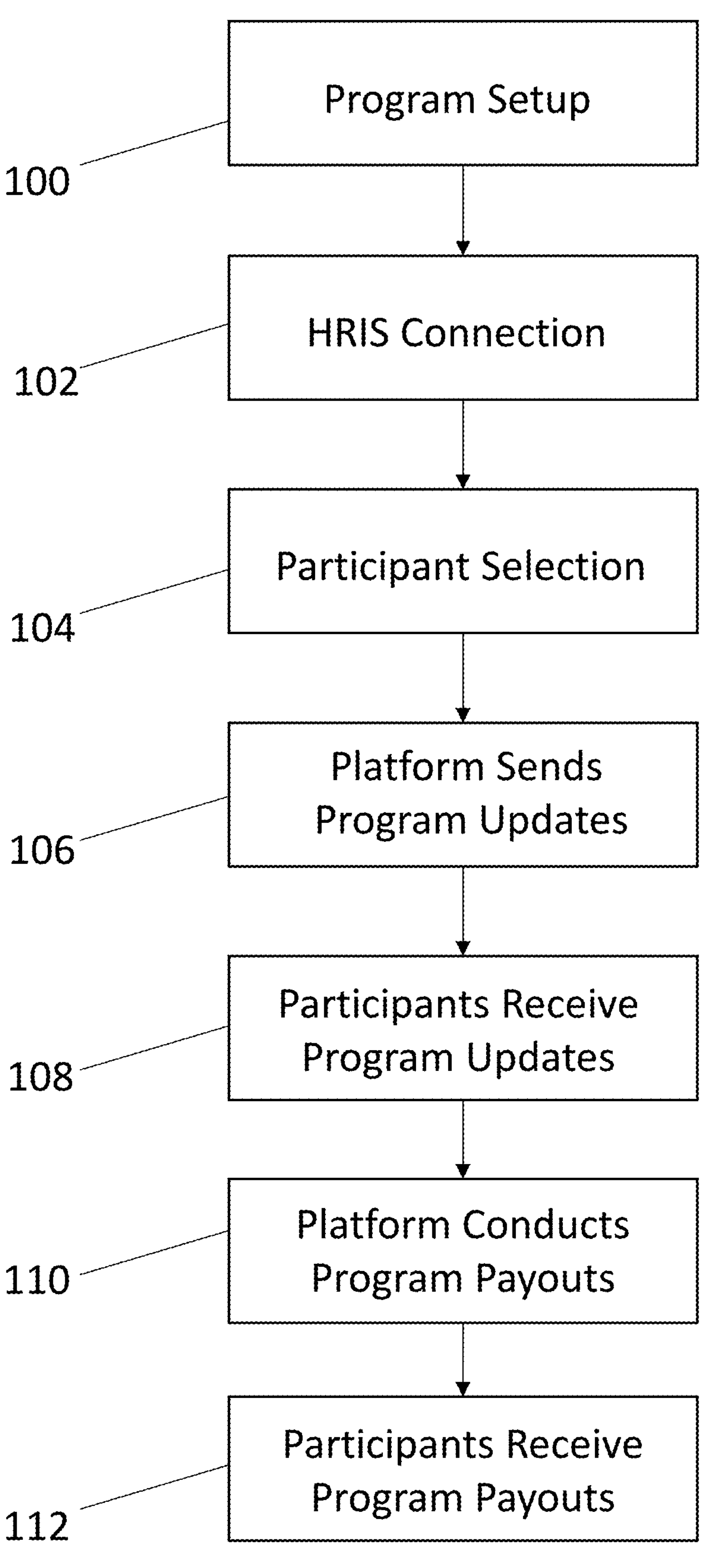
FIG. 11 is a schematic diagram of a process for setting up and executing a program according to one embodiment of the present invention.

FIG. 11 is a schematic diagram of a process for setting up and executing a program according to one embodiment of the present invention. In one embodiment, a first step 100 of the system of the present invention is for the platform to set up a program based on input selection of an administrator profile. In one embodiment, the first step 100 is able to include a designation of an expected salary multiple as a form of benefit provided at the end date (or any other form of benefit). In one embodiment, the first step 100 includes weightings for salary and/or tenure of each participant (e.g., higher salary individuals get a higher or lower percentage, longer tenure individuals get a higher percentage, etc.). After setting up the parameters of the program in the first step 100, the second step 102 includes the platform establishing connection with an HRIS based on input from the administrator profile. In one embodiment, the second step 102 includes the platform obtaining login credentials, verifying connection with the HRIS based on the login credentials, and receiving selection of synchronization times and/or synchronization frequency. In one embodiment, after the second step 102 establishes connection with an HRIS, the third step 104 includes establishing a list of participants for the program. In one embodiment, participants are automatically established based on information in the HRIS. However, the third step 104 is further able to include the platform receiving one or more exclusions of particular employees or classes of employees from participation in the program.

After the program is fully established in steps 1-3, the fourth step 106 includes the platform transmitting, regularly or as a result of administrator profile input, update messages for the program, with the fifth step 108 being the participants receiving those update messages. In one embodiment, the update messages include updated information regarding progress toward financial objectives, total expected payout, and currently expected payout for each participant based on current trends.

When the end date is reached, the platform executes the sixth step 110, which includes the platform automatically executing program payouts, with the seventh and final step 112 being the participants receiving the payout from the program. Payouts are able to be made based on synchronization HRIS data, which helps to determine which participants to automatically pay out to, financial accounts to send funds to (if the benefit is monetary), and the amount to pay out to each participant. In one embodiment, details of the financial account from which funds are automatically withdrawn in order to make the payments is received from an administrator profile for the program.

While different types of payouts and benefits are contemplated herein, in one embodiment, the employee's share (E) of the payout is calculated according to equation 1, provided below, where a is the salary weight, b is the tenure weight, S is the total salary during the BBOP period for the employee, T is the tenure of the employee, and Total Share is the combined salary and tenure of all employees (with weightings):

$$E = \frac{aS + bT}{TotalShare}$$

The payout for each employee is then able to be calculated as the employee's share multiplied by the expected payout or multiplied by the total payout.

One of ordinary skill in the art will understand that the system of automatically executing liquidation events for securities is not limited to non-ownership-based securities, and that the present system is also able to be applied to more traditional securities. In such a system, steps concerning checking for participation or ownership at liquidation need not utilize a ledger oracle to determine ownership rules, but is able to access and utilize a list of defined owners for the security. Furthermore, the present invention is able to be integrated into a broader platform for organizing and transacting tokenized securities, such as is described in U.S. Pat. No. 12,205,172, which is incorporated herein by reference in its entirety.

Figure 12:
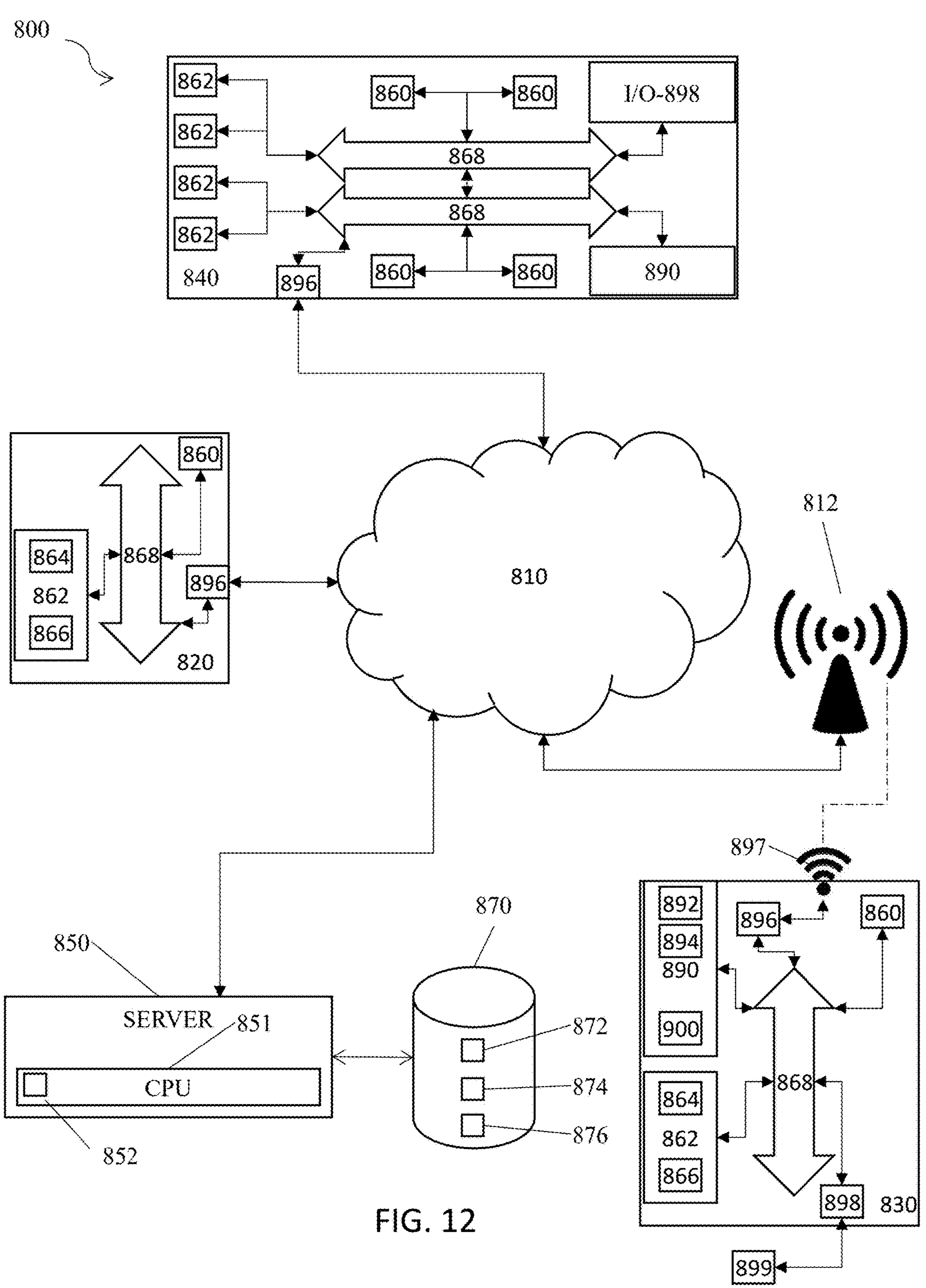
FIG. 12 is a schematic diagram of a system of the present invention.

FIG. 12 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, gaming controllers, joy sticks, touch pads, signal generation devices (e.g., speakers), augmented reality/virtual reality (AR/VR) devices (e.g., AR/VR headsets), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 12, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable to be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 12, is operable to include other components that are not explicitly shown in FIG. 12, or is operable to utilize an architecture completely different than that shown in FIG. 12. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A system for generating a non-ownership-based security and automatically executing a liquidation event for the non-ownership-based security, comprising:

a server platform, including a processor and a memory, operable to generate a plurality of user profiles associated with a plurality of user devices;

wherein the server platform receives selection from one or more of the plurality of user devices of parameters for the non-ownership-based security, including a start date, an end date, one or more participation rules, and/or one or more distribution rules, and wherein the server platform generates the non-ownership-based security based on the parameters;

wherein the parameters are recorded on an immutable, distributed ledger;

wherein the server platform connects to at least one internal database or at least one external database and receives information regarding one or more participants in the non-ownership-based security from the at least one internal database or the at least one external database;

wherein the server platform determines a liquidation trigger event;

wherein the server platform utilizes a ledger oracle to automatically determine the one or more participation rules for the non-ownership-based security and determines one or more designated beneficiaries of the non-ownership-based security, wherein the one or more designated beneficiaries become identifiable upon the liquidation trigger event, wherein the determination of the one or more designated beneficiaries of the non-ownership-based security is based on the one or more participation rules;

wherein the server platform utilizes the ledger oracle to determine the one or more distribution rules for the non-ownership-based security and determines an amount to distribute to the one or more designated beneficiaries based on the one or more distribution rules; and wherein the server platform automatically distributes funds and/or other benefits to one or more financial accounts associated with the one or more designated beneficiaries.

2. The system of claim 1, wherein the server platform receives updated information from the at least one internal database or the at least one external database at regular intervals based on selection from the one or more of the plurality of user devices.

3. The system of claim 1, wherein the at least one external database includes at least one human resource information system (HRIS).

4. The system of claim 1, wherein the liquidation trigger event includes at least one company meeting at least financial objective.

5. The system of claim 1, wherein the server platform is operable to automatically transmit update messages to the one or more participants, and wherein the update messages include a value of the non-ownership-based security, a potential distribution value to each of the one or more participants, and/or progress toward the liquidation trigger event.

6. The system of claim 1, wherein the server platform further utilizes the ledger oracle to determine liquidation value rules to determine a total value of the non-ownership-based security.

7. The system of claim 1, wherein the server platform further utilizes the ledger oracle to determine when the liquidation trigger event occurs.

8. The system of claim 1, wherein the one or more of the plurality of user devices is associated with at least one administrator profile.

9. A method for generating a non-ownership-based security and automatically executing a liquidation event for the non-ownership-based security, comprising:

a server platform, including a processor and a memory, generating a plurality of user profiles associated with a plurality of user devices;

wherein the server platform receiving selection from one or more of the plurality of user devices of parameters for the non-ownership-based security, including a start date, an end date, one or more participation rules, and/or one or more distribution rules, and generating the non-ownership-based security based on the parameters;

recording the parameters on an immutable, distributed ledger;

the server platform connecting to at least one internal database or at least one external database and receiving information regarding one or more participants in the non-ownership-based security from the at least one internal database or the at least one external database;

the server platform determining a liquidation trigger event;

the server platform utilizing a ledger oracle to determine the one or more participation rules for the non-ownership-based security and automatically determining one or more designated beneficiaries of the non-ownership-based security, the one or more designated beneficiaries becoming identifiable upon the liquidation trigger event, and the determination of the one or more designated beneficiaries of the non-ownership-based security being based on the one or more participation rules;

the server platform utilizing the ledger oracle to determine the one or more distribution rules for the non-ownership-based security and determining an amount to distribute to the one or more designated beneficiaries based on the one or more distribution rules; and the server platform automatically distributing funds and/or other benefits to one or more financial accounts associated with the one or more designated beneficiaries.

10. The method of claim 9, further comprising the server platform receiving updated information from the at least one internal database or the at least one external database at regular intervals based on selection from the one or more of the plurality of user devices.

11. The method of claim 9, wherein the at least one external database includes at least one human resource information system (HRIS).

12. The method of claim 9, wherein the liquidation trigger event includes at least one company meeting at least financial objective.

13. The method of claim 9, further comprising the server platform automatically transmitting update messages to the one or more participants, wherein the update messages include a value of the non-ownership-based security, a potential distribution value to each of the one or more participants, and/or progress toward the liquidation trigger event.

14. The method of claim 9, further comprising the server platform utilizing the ledger oracle to determine liquidation value rules to determine a total value of the non-ownership-based security.

15. The method of claim 9, further comprising the server platform utilizing the ledger oracle to determine when the liquidation trigger event occurs.

16. The method of claim 9, wherein the one or more of the plurality of user devices is associated with at least one administrator profile.

17. A system for generating a non-ownership-based security and automatically executing a liquidation event for the non-ownership-based security, comprising:

a server platform, including a processor and a memory, operable to generate a plurality of user profiles associated with a plurality of user devices;

wherein the server platform receives selection from one or more of the plurality of user devices of parameters for the non-ownership-based security, including a start date, an end date, one or more participation rules, one or more liquidation value rules, and/or one or more distribution rules, and wherein the server platform generates the non-ownership-based security based on the parameters;

wherein the parameters are recorded on an immutable, distributed ledger;

wherein the server platform determines a liquidation trigger event;

wherein the server platform utilizes a ledger oracle to determine the one or more liquidation value rules to determine a total value of the non-ownership-based security, wherein the server platform utilizes the ledger oracle to automatically determine the one or more participation rules for the non-ownership-based security and determines one or more designated beneficiaries of the non-ownership-based security, wherein the one or more designated beneficiaries become identifiable upon the liquidation trigger event, wherein the determination of the one or more designated beneficiaries of the non-ownership-based security based on the one or more participation rules;

wherein the server platform utilizes the ledger oracle to determine the one or more distribution rules for the non-ownership-based security and determines an amount to distribute to the one or more designated beneficiaries based on the one or more distribution rules; and wherein the server platform automatically distributes funds and/or other benefits to one or more financial accounts associated with the one or more designated beneficiaries.

18. The system of claim 17, wherein the liquidation trigger event includes at least one company meeting at least financial objective.

19. The system of claim 17, wherein the server platform further utilizes the ledger oracle to determine when the liquidation trigger event occurs.

20. The system of claim 17, wherein the one or more of the plurality of user devices is associated with at least one administrator profile.

* * * * *